Jan. 15, 1935.  C. A. BROWN ET AL  1,988,297
METHOD OF AND APPARATUS FOR BLOWING BULBS AND SIMILAR ARTICLES
Filed April 6, 1932  4 Sheets-Sheet 3
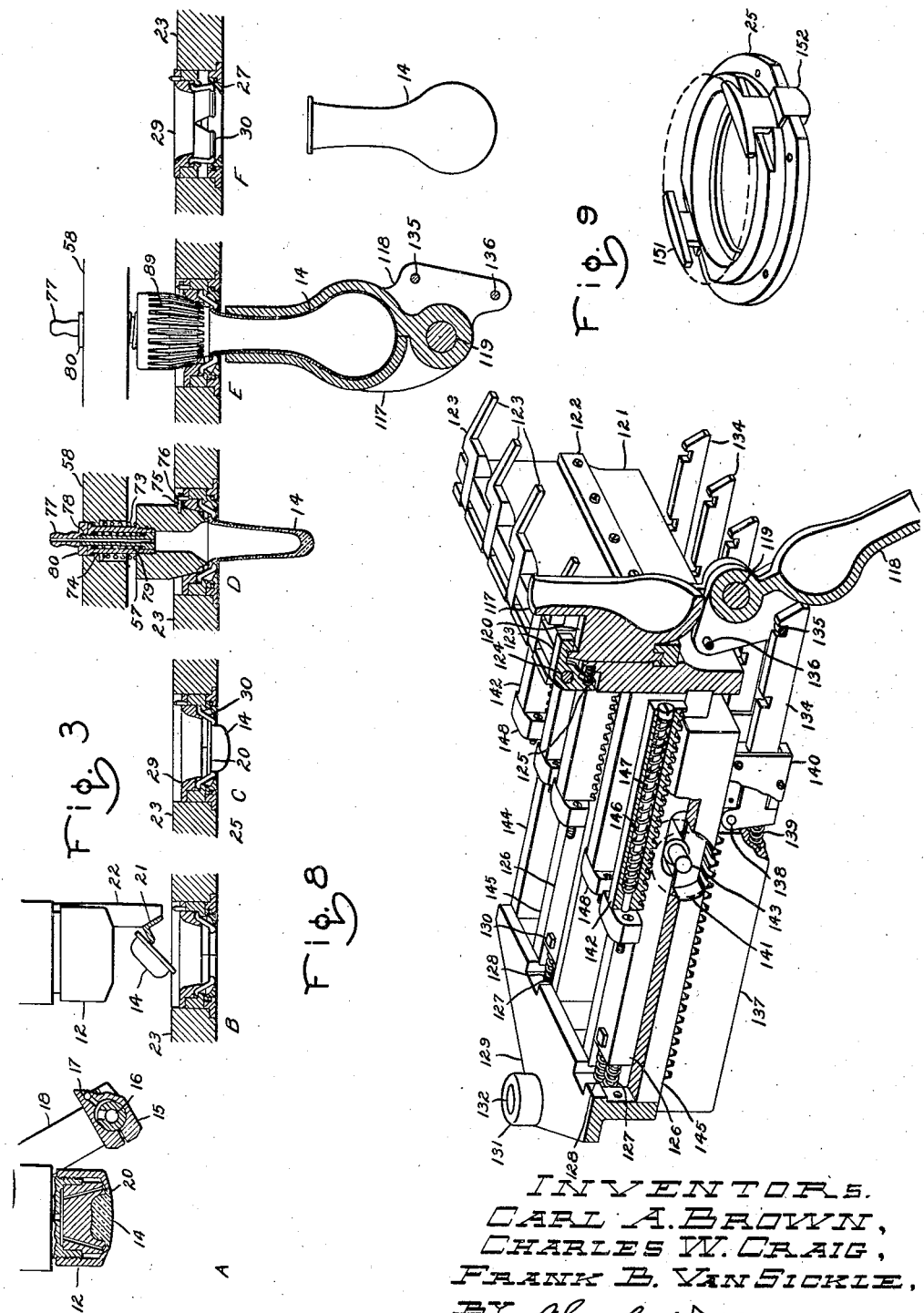
INVENTORS.
CARL A. BROWN,
CHARLES W. CRAIG,
FRANK B. VanSICKLE,
BY Charles V. Mullan
THEIR ATTORNEY.

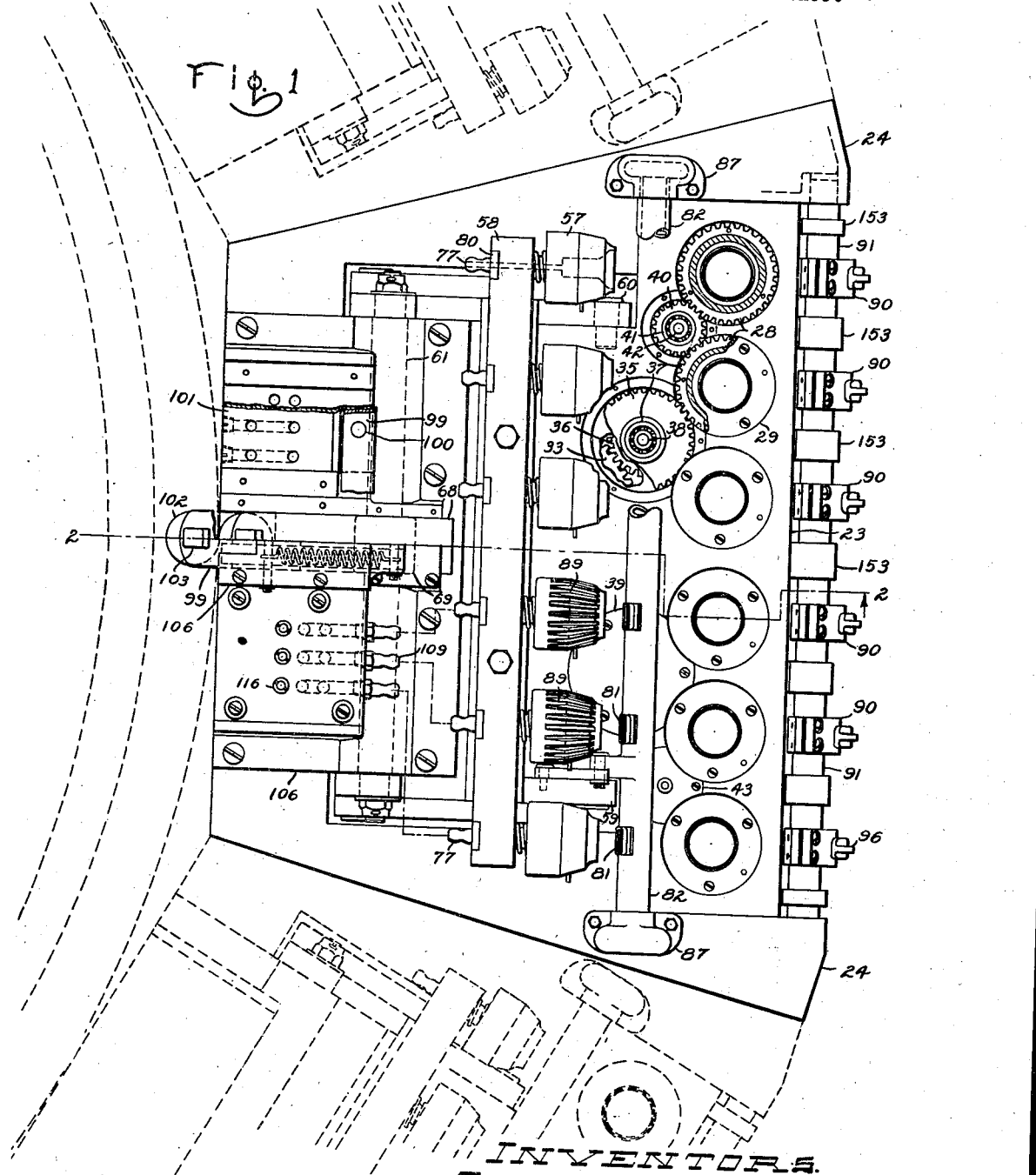

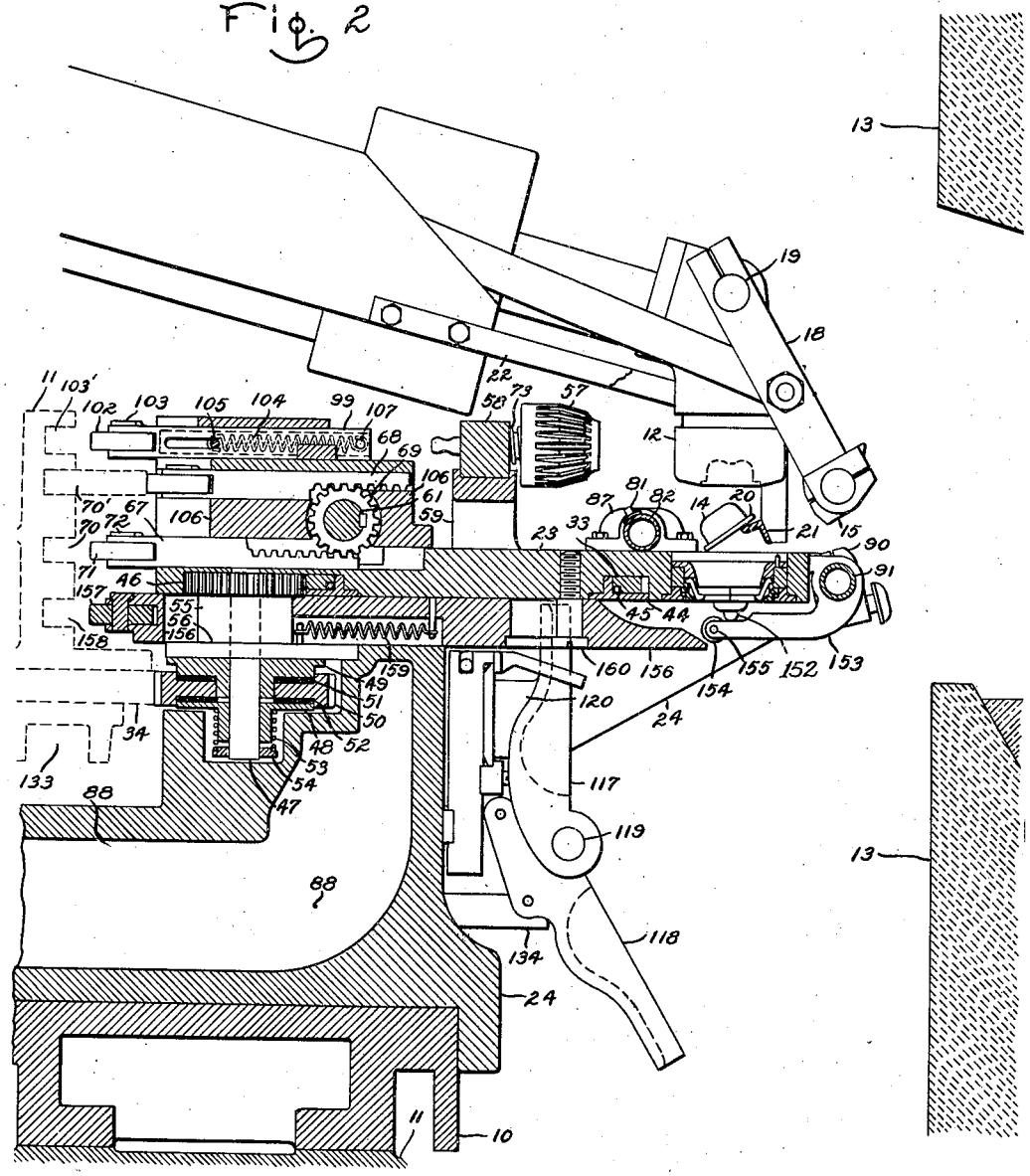
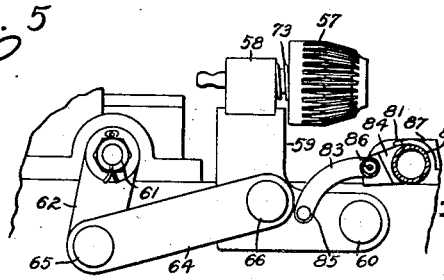

Jan. 15, 1935.   C. A. BROWN ET AL   1,988,297
METHOD OF AND APPARATUS FOR BLOWING BULBS AND SIMILAR ARTICLES
Filed April 6, 1932   4 Sheets-Sheet 4
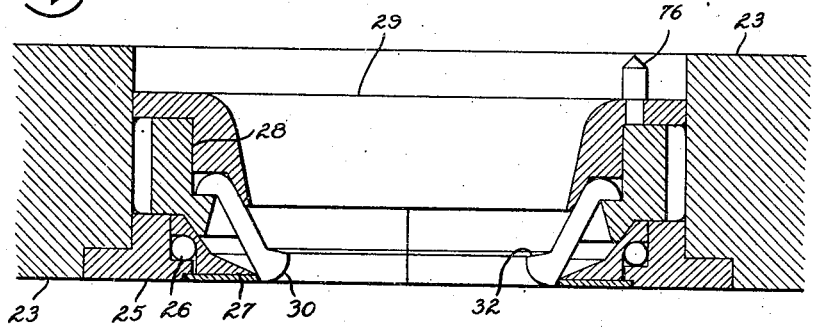
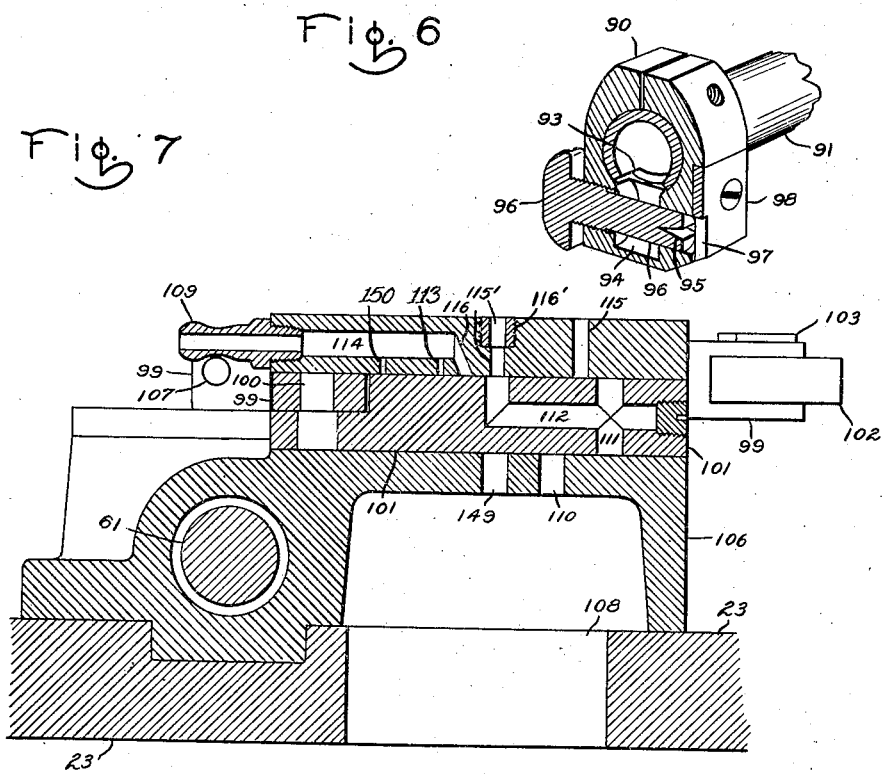
INVENTORS.
CARL A. BROWN,
CHARLES W. CRAIG,
FRANK B. VAN SICKLE,
BY Charles E. Mullen
THEIR ATTORNEY.

Patented Jan. 15, 1935

1,988,297

UNITED STATES PATENT OFFICE 1,988,297

METHOD OF AND APPARATUS FOR BLOWING BULBS AND SIMILAR ARTICLES

Carl A. Brown and Charles W. Craig, East Cleveland, and Frank B. Van Sickle, Euclid, Ohio, assignors to General Electric Company, a corporation of New York Application April 6, 1932, Serial No. 603,494

10 Claims. (Cl. 49—5)

Our invention relates to methods and machinery for manufacturing glass articles such as lamp bulbs and the like. More particularly, our invention relates to machinery for blowing said articles from glass blanks of predetermined shape and size and to machinery for supporting the glass blanks during the blowing operation. Our machine is of the same general type disclosed in Patent No. 1,527,556 to Kadow issued February 24, 1925, and provides mechanism for gathering glass blanks from within the furnace and other mechanism for blowing and molding said blanks. The latter mechanism comprises a plurality of heads on a constantly rotating turret which turn on their own centers, blowing apparatus which engages the glass blanks in said heads, and molds which move into engagement with said blanks.

One object of our machine is to provide means for turning the glass blank over (through 180°) as said blank travels from the gathering to the forming mechanisms. This is desirable because the lower end of the blank is cooled most during the gathering and therefore is utilized to support the blank during the blowing operation. This is especially desirable in the case of bulbs and thin walled articles since it allows the article to be formed from the end of the blank which is less likely to be marked. The severance of the blank from the molten glass during gathering is likely to cause marking at the other end which is in the plane of severance. Another object is to provide the forming portion of our machine in sections or units, each of which is self contained and operated. Still another object is to provide an improved means for supporting and rotating the blank during blowing of the article. Other features and advantages will appear from the drawings and the detailed description of a species which follows.

Now referring to the drawings, Fig. 1 is a plan view of one section of the machine of our invention; Fig. 2 is a vertical section along line 2—2 of Fig. 1; Fig. 3 shows vertical sections of the blank and co-acting parts in various stages of manufacture; Fig. 4 is a vertical section through one of the machine heads; Fig. 5 is a side elevation of the blow head operating mechanism; Fig. 6 is a sectional perspective view of the blank cooling air nozzle; Fig 7 is a vertical section through the air valve which controls the blowing of the blank; Fig. 8 is a sectioned perspective view of the mold operating mechanism; and Fig. 9 is a perspective view of a portion of the head.

The machine constructed according to our invention comprises a blank gathering mechanism preferably of the type disclosed in application Serial No. 204,378, filed July 8, 1927, Brown et al., a machine frame similar in construction to that shown in the Kadow patent hereinbefore referred to, and a turret as shown herein slidably mounted on said frame which supports indirectly the machine heads. The gathering mechanism is mounted on the central portion of the frame which protrudes up through a central opening in the turret. The turret 10 which is only partially shown is a circular ring slidably mounted about the periphery of the frame 11 and operates all mechanism attached thereto by its rotary motion which is provided by engagement of driving means (not shown) with a large gear attached thereto. The machine heads are in this particular case divided into groups of six which form sections or units of which twelve are mounted on the upper surface of the turret 10. These sections are identical and all heads therein are filled by one cycle of operation of the gathering mechanism which is provided with a like number of heads.

The gathering heads 12 move into the furnace 13, suck up a quantity of glass 14 and return to the position shown. During the inward motion of the heads knives 15 move to the left of the heads and with the outward motion said knives move to the right across the heads cutting off the excess glass adhering thereto. The knives are cooled as shown in division A of Fig. 3 by circulation of water in passages 16 and 17 therein and are operated by lever 18 which swings from pin 19. Said knives leave in the gathering heads, glass blanks 14 the size and shape of the apertures therein and each having a flange 20 at one end. The gathering heads now take motion in a clockwise direction about the machine bringing themselves into alignment with the machine heads and holding said position for a few degrees of rotation. During the short interval in which said heads are in alignment the blanks 14 are forced out of the gathering head by air and each is allowed to drop against a bar 21 so that its flange 20 strikes said bar and this causes the blank to turn over substantially 180° before falling into the machine head as shown in sections B and C of Fig. 3. The gathering mechanism completes one cycle of operation by returning to the position shown through motion in a counter-clockwise direction and the section carrying the six filled heads continues on its course of rotation. Bar 21 is supported by arms 22 which extend from a portion of the gathering mechanism which does not move into the furnace but moves radially with the said mechanism.

The six machine heads of one section are mounted in plate 23 which is supported by the body 24 of this section and are operated by mechanism held thereby. Each head as shown in Fig. 4, comprises a retaining ring 25 which supports through ball bearings 26 a positioning ring 27, gear 28, guide ring 29 and blank supporting ring 30. Ring 30 is made up of four equal divisions which are supported by gear 28 and which are kept from hanging directly downward therefrom by ring 27. Said ring pushes the lower ends of said segments which are tapered into engagement, forming thereby a ring of lesser diameter. As the blank falls into the head, the flange 20 which is in a partially cooled state is guided by ring 29 into engagement with rest 32 provided by the four segments of ring 30. As shown in Figs. 1 and 2, each of the heads is rotated indirectly by ring gear 33 which in turn is operated indirectly from a stationary gear 34 on the frame 11 by the rotation of the section about said frame. The four innermost heads are operated in pairs, one pair being operated by gear 35 which meshes with gear 28 of each head and which is in turn operated from ring gear 33 by gear 36, and the other pair being operated by a duplicate arrangement. Gears 35 and 36 are made from the same piece of metal and turn about bearings 37 on pin 38 which is supported by plate 23 and cover plate 39. The outermost heads are operated from the heads adjacent thereto by gears 40 which mesh with gears 28 of the heads and which turn about bearing 41 on pin 42 in plate 23 and cover plates 43. Ring gear 33 is held in a recess in plate 23 by retaining ring 44 which engages said gear through ball bearings 45 and is turned by gear 46 on spindle 47 which is driven by friction plates 48 and 49. The plates are part of a constantly engaged friction clutch of which gear 50 meshes with gear 34 and drives said plates through friction discs 51 and 52. Said plates are pressed into engagement by spring 53 which works between collar 54 on spindle 47 and plate 48. Collar 55 and plate 56 support the clutch from body 24.

When clearance has been provided by the rotation of the machine section, blow heads 57 are brought against the blank, clamping it as shown in section D of Fig. 3. The blow heads are mounted on bar 58 which is attached to yoke 59 which is in turn pivotally attached to plate 23 by pins 60. Movement is provided in said yoke by shaft 61 which operates through arm 62, link 64 and pins 65—66 as shown in Fig. 5 and is operated by racks 67 and 68 (Fig. 1) through gear 69. Rack 67 causes the blow head to move into position by turning shaft 61 in one direction and rack 68 causes the return movement. Motion of the racks is caused by cams placed in openings 70 and 70' of the frame which engage rollers 71 on pins 72 in the racks. The excess motion of bar 58 is taken up by spring 73 and sliding motion of spindle 74 to which said blow head is attached. The blow heads are turned with the machine head by pin 75 in said head engaging pin 76 in guide ring 29 and are used only to clamp the blank in place during the rotation of the section while the body portion of the blank sags as shown. Means are provided for carrying air into the blow heads from nipples 77, which do not rotate with the blow heads, by hollow bolts 78 and springs 79 which preserve the air seal between nipples 77 and spindles 74. Nipples 77 are kept from rotating by square flange 80 which engages bar 58. Means are provided for cooling the blow heads in both positions by nozzles 81 on manifold 82 which is turned by yoke 59 to which it is connected by link 83, lever 84 and pins 85 and 86. The ends of said manifold are held in brackets 87 which are attached to body 24 and which provide said manifold with air through passages (not shown) in said body connecting to passage 88. The blow heads are provided with fins 89 in order to present greater cooling area.

As the blanks are carried along they are cooled by air emitted from nozzles 90 and are caused to expand by a series of air puffs from the blow heads. The nozzles are constructed as shown in Fig. 6 and are mounted on pipe 91 to which air is supplied through passages (not shown) in body 24 connecting to passage 88. The air passes through openings 93 in the pipe into chamber 94 from which it is allowed to pass by V slot 95 in valve 96 out through the slot 97 in plate 98. Passage 88 receives the air from the frame 11 in which passages are provided which are fed from a convenient source of air and which are caused by rotation of the section to come into alignment with passage 88. The construction of this portion of the machine is not shown as it conforms to the usual practice. The air puffs are created by the valve shown in Figs. 2 and 7 which is divided into two sections. Each section controls three blow heads and is operated by slide 99 which is connected by pins 100 to slide 101 in each section. Slide 99 is operated through roller 102 and pin 103 by a cam in space 103' of the frame 11 and is kept in contact therewith by springs 104 which are located in openings therein and which are connected between post 105 in valve body 106 and pin 107 in said slide. The air passes to the valve from passage 88 through openings 108 in plate 23 and from the valve by nipples 109 and hose (not shown) to nipples 77 of the blow head. During the duration of the puff slide 101 (Fig. 7) takes such a position that the air flows through the following passages 110, 111, 112, 113 and 114. The number and duration of the air puffs is controlled by the number and lengths of the cams in slot 103' in the frame. During the rest period said slide 101 takes a position in which passages 111 and 112 are aligned with passages 115 and 116 respectively thus opening the passage 114 to the atmosphere through passages 116, 112, 111 and 115.

The blanks are now enclosed by the molds and a long air blow at reduced pressure forced into said blanks causing them to take shape as shown in section E of Fig. 3. The said long air blow occurs when passages 111 and 112 are aligned with passages 149 and 115', and 150 respectively. Full air pressure does not pass to the blow head as the air passage 112 is bled by passage 115' and screw 116'. The molds are in two parts, 117 and 118 (Fig. 8) which are hinged together by pin 119 and which are supported through bracket 120 of mold half 117. Said bracket fits against the face of plate 121 to which it is held by bar 122 and latches 123. Said latches turn about rod 124 and are kept in engagement with said bracket by spring 125. The mold operating mechanism shown in Fig. 8 operates in ways provided therefor although not shown in body 24 and causes said mold parts to first move into alignment with the partially blown bulb and then to come together. The alignment movement occurs as slides 126 which support plate 121 are moved by springs 127 and 128 and bracket 129 and stops when block 130 strikes a screw (not shown), in body 24. Bracket 129 is moved by roller 131 on pin 132 which engages cam ways 133 (Fig. 2) in the frame 11 of the machine. The molds are closed by arms 134 which engage through slots therein pins 135 and 136 in mold half 118 and which are attached to rack 137 by pin 138. Said arms are caused to follow the circular movement of pins 135 and 136 by springs 139 which turn the arms about pin 138 and are confined in a cavity in said racks by plates 140. The racks are operated by gears 141 (indicated by dotted lines) which also mesh with racks 142 and which are slidably engaged by spindles 143. In the operating mechanisms for the outer molds, spindles 143 are attached to bar 144 extending from bracket 129 while in said mechanism for each pair of molds on either side of center said spindles are supported by channel 145 extending from bracket 129. The motion of bracket 129 produces the mold closing action as racks 142 are normally stationary and only move against springs 146 on pins 147 which are attached to the body by block 148 after the molds have closed thereby taking up all excess motion. The long blow at reduced pressure produced by the blow head 57 is provided by slides 101 of the air valve which move into positions in which passages 149, 111, 112 and 150 are aligned.

The glass articles now having been formed and cooled by the molds are released from the molds and blow heads by their return to the rest position. The article is then dropped through the head as shown in section F of Fig. 3 by the separation of the four segments in rings 30 which are carried upward with gear 28 and are therefore no longer pressed into a complete ring by ring 27. The combined weight of the glass article causes said segments to take the open position shown. Each gear 28 is raised by a pair of slides 151 and 152, shown in Fig. 9, which are engaged by levers 153 on pipe 91. Lever 153 shown (Fig. 2) differs from the others in that it is provided with roller 154 on pin 155 and operates said pipe by engagement with slide 156. Said slide is moved into the engagement by roller 157 striking a cam in space 158 in the frame 11 and is moved back by spring 159 which operates between a post in said slide and another in plate 56. Screw 160 supports the end of said slide. The glass article released by the head is caught by a chute (not shown) and carried away from the machine as it represents the finished product of the machine.

What we claim as new and desire to secure by Letters Patent of the United States, is,—

1. The method of blowing glass articles which consists in gathering a blank from a supply of molten glass in a mold open at its bottom, withdrawing said mold from said supply, causing the blank contained in said mold to drop into a blank supporting means and meanwhile to turn over substantially 180° and finally blowing said blank into the desired article.

2. The method of blowing glass articles which consists in gathering a blank from a supply of molten glass in a mold open at its bottom, withdrawing said mold from said supply, causing said mold from said supply, causing the blank support and during its fall to be inverted, rotating said blank support and blowing into the rotating blank.

3. The method of blowing glass bulbs which consists in gathering a blank from a supply of molten glass in a mold open at its bottom and shaped to form a flanged blank, withdrawing said mold from said supply, causing the blank contained in said mold to drop into a means engaging the flange of said blank and supporting the blank and meanwhile to turn over substantially 180° and finally blowing said blank into a bulb.

4. The method of blowing bulbs which consists in gathering in a mold by suction from a supply of molten glass a blank widest at its bottom, dropping said blank and inverting it to cause it to fall into a blank supporting means with its widest portion uppermost, gripping said uppermost portion and then blowing into said blank.

5. The method of blowing bulbs which consists in gathering in a mold by suction from a supply of molten glass a blank widest at its bottom, dropping said blank and inverting it to cause it to fall into a blank supporting means with its widest portion uppermost, gripping said uppermost portion and then blowing into said blank and rotating said blank supporting means.

6. The method of blowing bulbs which consists in gathering in a mold by suction from a supply of molten glass a blank widest at its bottom, dropping said blank and inverting it to cause it to fall into a blank supporting means with its widest portion uppermost, gripping said uppermost portion, then blowing into said blank and puffing out said blank while rotating it and finally closing a mold about said blank while blowing to form a bulb therefrom.

7. In an apparatus for forming glass articles, the combination of a gathering mold, mechanism for advancing said mold into a supply of molten glass and retracting it therefrom, a blank supporting head and a body positioned to encounter a blank dropped from said gathering mold and to invert said blank before it reaches said supporting head.

8. In an apparatus for forming glass articles, the combination of a gathering mold open at its bottom and having an annular recess at the bottom adjacent said opening to form a flange on a blank gathered therein, mechanism for advancing said mold into a supply of molten glass and retracting it therefrom, a blank supporting head having means for engaging said flange on said blank and a body positioned to encounter the blank dropped from said gathering mold and to invert said blank before it reaches said supporting head.

9. In an apparatus for blowing glass articles, a blank supporting means comprising a ring having a plurality of sections, each of which is pivotally mounted near the outer rim thereof, a second ring engaging the outer and lower surface of said ring sections and holding them in engagement with each other, mechanism for blowing and molding said blank and mechanism for raising the blank supporting ring so that it is drawn from engagement with the second ring and so the lower end of the ring sections will separate and the blank be allowed to fall through.

10. In an apparatus for blowing glass articles, a blank supporting means comprising a ring consisting of a plurality of sections and having an annular shoulder at its upper rim by means of which said ring sections are pivotally supported and an inwardly protruding rim at its lower edge which supports the blank, a second ring engaging the outer and lower surface of said ring sections and holding them in engagement with each other, mechanism for blowing and molding said blank and mechanism for raising the blank supporting ring by the said annular shoulder thereon so that it is drawn from engagement with the second ring and so the lower end of the ring sections will separate and the blank be allowed to fall through.

CARL A. BROWN.
CHARLES W. CRAIG.
FRANK B. VAN SICKLE.

CERTIFICATE OF CORRECTION.

Patent No. 1,988,297.  January 15, 1935.

CARL A. BROWN, ET AL.

It is hereby certified that error appears in the printed specification of the the above numbered requiring correction as follows: Page 3, first column, line 75, claim 2, strike out the words "mold from said supply, causing the" and insert instead blank to fall from said mold into a; and that the said Letters Patent should be read with this correction therein that the same may conform to the record of the case in the Patent Office.

Signed and sealed this 12th day of March, A. D. 1935.

Leslie Frazer
Acting Commissioner of Patents.

(Seal)